(12) United States Patent
Vella et al.

(10) Patent No.: US 7,676,082 B2
(45) Date of Patent: Mar. 9, 2010

(54) METHOD AND ARCHITECTURE FOR COMPRESSING IMAGE DATA ACQUIRED FROM A BAYER COLOR FILTER ARRAY

(75) Inventors: Filippo Vella, Erice (IT); Arcangelo Ranieri Bruna, San Cataldo (IT); Antonio Vincenzo Buemi, Catania (IT)

(73) Assignee: STMicroelectronics, S.R.L., Agrate Brianza (MI) (IT)

( * ) Notice: Subject to any disclaimer, the term of this patent is extended or adjusted under 35 U.S.C. 154(b) by 1310 days.

(21) Appl. No.: 11/146,469

(22) Filed: Jun. 7, 2005

(65) Prior Publication Data
US 2006/0013314 A1 Jan. 19, 2006

(30) Foreign Application Priority Data
Jun. 7, 2004 (EP) .................. 04425415

(51) Int. Cl.
*G06K 9/00* (2006.01)
*G06K 9/36* (2006.01)
*G06K 9/46* (2006.01)

(52) U.S. Cl. .................. 382/166; 382/232; 382/238; 382/239

(58) Field of Classification Search .................. 382/166, 382/232, 238, 239; 348/394, 409.1
See application file for complete search history.

(56) References Cited

U.S. PATENT DOCUMENTS 4,468,708 A * 8/1984 Coleman, Jr. ................ 386/33

| | | | | |
|---|---|---|---|---|
| 4,885,637 A | * | 12/1989 | Shikakura et al. ...... | 375/240.12 |
| 4,910,586 A | * | 3/1990 | Sharpe .................. | 375/240.01 |
| 5,204,899 A | | 4/1993 | Israelsen et al. ............... | 380/14 |
| 6,463,100 B1 | * | 10/2002 | Cho et al. .............. | 375/240.03 |

(Continued)

FOREIGN PATENT DOCUMENTS
EP 1 406 447 4/2004

OTHER PUBLICATIONS

Gray et al. "Quantization", IEEE Transactions on Information Theory, vol. 44, Issue 6, Oct. 1998 pp. 2325-2383.*

(Continued)

*Primary Examiner*—Samir A. Ahmed
*Assistant Examiner*—Li Liu
(74) *Attorney, Agent, or Firm*—Lisa K. Jorgenson; Allen, Dyer, Doppelt, Milbrath & Gilchrist, P.A.

(57) ABSTRACT

For each color channel, the process includes gathering Bayer pattern pixel values by pairs, each pair being composed by two successive pixels belonging to the channel along the scanning direction of the pixels of the image, thus each pair of values representing a current input vector, and calculating a predictor vector of the input vector in terms of the differences between the values defining the input vector and a pair of prediction values generated according to a certain criterion, for representing a prediction error. The process further includes quantizing each so calculated predictor vector according to a heavier or lighter degree of quantization depending on whether the predictor vector is representative of an area of relatively uniform color of the image or of an area of relatively abrupt changes of colors of the image, and generating a multibit code representative of the quantized predictor vector of the input vector according to a certain compression ratio.

14 Claims, 4 Drawing Sheets

U.S. PATENT DOCUMENTS

| | | | |
|---|---|---|---|
| 6,614,483 | B1 | 9/2003 | Lee et al. ................. 348/391.1 |
| 2002/0054692 | A1* | 5/2002 | Suzuki et al. ............... 382/100 |
| 2005/0063472 | A1* | 3/2005 | Vella et al. ............. 375/240.22 |

OTHER PUBLICATIONS

Chin Chye Koh et al., "Compression of Bayer Color Filter Array Data", Proceedings of International Conference on Image Processing, Sep. 14-17, 2003, Barcelona, Spain, vol. 4 dated Sep. 14, 2003, pp. 255-258.

Vitali et al., Proceedings of the second IASTED International Conference on "Communications, Internet, and Information Technology", Nov. 17-19, 2003, Scottsdale, AZ, USA, pp. 515-521, XP008037963, ISBN: 0-88986-398-9.

Chun et al., "An Adaptive Perceptual Quantization Algorithm for Video Coding", IEEE Transactions on Consumer Electronics, IEEE Inc., New York, USA, vol. 39, No. 3, Jun. 8, 1993, pp. 555-558, XP002180113, ISSN: 0098-3063.

\* cited by examiner

METHOD AND ARCHITECTURE FOR COMPRESSING IMAGE DATA ACQUIRED FROM A BAYER COLOR FILTER ARRAY

FIELD OF THE INVENTION

The present invention relates to image acquisition and image data processing methods and devices. More particularly, the invention relates to a pipeline for generating a high quality color image by carrying out interpolation of chrominance data of pixel data coming from an image sensor for outputting interpolated image pixel data.

BACKGROUND OF THE INVENTION

Generally, when using a video camera or a digital still camera to photograph a color image, the incident light passes through filters for extracting certain wavelength components such as the basic color components R (red), G (green) and B (blue). In two-dimensional imaging, the imaging unit is composed of many pixels arranged in the vertical and horizontal directions. Each pixel of the two-dimensional image contain either red, green or blue color light because of the filtering of the incident light. A color sensing array of this type is disclosed in the document U.S. Pat. No. 3,971,065 (B. E. Bayer).

According to one of several alternative techniques, the type of filter is changed for every pixel and the filters are cyclically aligned in the order: G, R, G, R . . . in the even rows of the pixel array of the sensor, and B, G, B, G . . . in the odd rows of the pixel array of the sensor. As a consequence, information of the photographed colored object is obtained only once every three pixels. In other words, an object cannot be color photographed other than in units of three pixels.

To reconstruct all the pixels of the two-dimensional image of the photographed object, it is necessary to interpolate chrominance pixel data to obtain the color components of red, green and blue color using information contained in neighboring pixels of the pixel to be reconstructed/enhanced. Generally, a value corresponding to the interpolated pixel is reconstructed by averaging corresponding values of a plurality of pixels surrounding the location of the pixel to be interpolated. Alternatively, the interpolated pixel may be determined by averaging the values of the pixels remaining after discarding pixels of maximum and minimum values of the neighbor pixels of the pixel to be interpolated. Also well known are techniques for detecting an edge of a photographical object by analyzing the pixels surrounding the considered cluster.

U.S. Pat. No. 5,373,322, U.S. Pat. No. 5,053,861, U.S. Pat. No. 5,040,064, U.S. Pat. No. 6,642,962, U.S. Pat. No. 6,570,616, U.S. published Patent Application No. 2003/0053687, U.S. Published Patent Application No. 2003/0007082, U.S. published Patent Application No. 2002/0101524, U.S. Pat. No. 6,366,694, European Patent Publication No. 0 497 493, European Patent Publication No. 1 176 550, and European Patent Publication No. 1 406 447, disclose techniques that are used in image processing.

Generally, the data acquired by the sensor according to a special pattern, for example the one known in the art as Bayer color-filter array (CFA), a pattern of which is characterized by associating just one of the three basic color components to each pixel, therefore a good quality RGB image is obtained by a specific image processing sequence (via hardware or image generation pipeline (IGP) or via software) to generate a high quality color image. Generally, in cascade of such an image processing subsystem is associated a data compressing block for reducing the band necessary for transmitting the color reconstructed image from the image processing subsystem or a mass storage support or to a remote receiver or to a display unit.

Data, for example in Bayer format, as acquired by a digital sensor clearly represent a gross approximation of the chromatic components of the reproduced scene, and it is of a paramount importance the accuracy with which color reconstruction via interpolation algorithms is performed on the raw chrominance data acquired by the digital sensor. Usefulness of Bayer data compression has emerged quite recently. Since it requires a relatively inexpensive solution, both in terms of computational complexity and hardware (HW) requirements, the most common way to address the problem has been to split Bayer image color channels and compress them independently using an efficient compression algorithm, for example differential pulse code modulation (DPCM), e.g. as discussed in R. M. Gray, D. L. Neuhoff, "Quantization", IEEE Trans. on Information Theory, vol. 44, n. 6, October 1998.

Acharya et al. (U.S. Pat. No. 6,154,493) have proposed a rather sophisticated compression method for images in Bayer pattern format. According to their approach the Bayer pattern image is considered as containing four independent color planes. In fact, since there are twice as many green related pixels as either of blue or red pixels, two distinct green planes are constructed mainly: G1 (containing green pixels in the same row as red pixels) and G2 (containing green pixels in the same row as blue). B and R color planes represent blue and red pixels respectively.

To exploit advantageously both the correlation between an R associated pixel and its G1 associated neighboring pixels and the correlation between associated pixel and its G2 and B associated neighboring pixels, compression is performed distinctly on each plane. G1 and G2 associated pixels are compressed directly, while each R pixel value is subtracted by its "west" neighboring G1 pixel value. Likewise, the difference (B−G2) is computed and planes (R−G1) and (B−G2) are then compressed. Compression is obtained in two main steps. Firstly, a 2-dimensional Discrete Wavelet Transform (DWT) is applied and secondly, DWT coefficients are quantized. DWT data are used because make possible to describe abrupt changes better then Fourier transform data.

The result is a lossy compression that is perceived by Human Visual System (HVS) to be lossless when decompressing is done. Decoding consists simply on inverting the coding steps: data are dequantized and then the Inverse DWT (IDWT) is performed. The four color channels may be separately decompressed. Once IDWT is performed, by adding back G1 to (R−G1) recovered value and G2 to (B−G2) recovered value, each Bayer original pixel value is restored.

Another sub band-coding compression method is described in T. Toi, M. Ohita, "A Sub band Coding Technique for Image Compression in Single CCD Cameras with Bayer Color Filter Arrays", IEEE Transaction on Consumer Electronics, Vol. 45, N. 1, pp. 176-180, February 1999.

Lee and Ortega proposed an algorithm for Bayer image compression based on Jpeg as discussed in Sang-Yong Lee, A. Ortega, "A Novel Approach of Image Compression in Digital Cameras With a Bayer Color Filter Array", In Proceedings of ICIP 2001—International Conference on Image Processing—Vol. III 482-485—Thessaloniki, Greece, October 2001.

Most digital cameras yield full color image by compressing an IGP image into a Jpeg image, after the color interpolation process performed by the IGP pipeline, but in this way in the interpolation step redundancy is increased, before being reduced by Jpeg compression. To overcome this drawback, the algorithm performs an image transformation to encode the image as a Jpeg image before color interpolation. The algorithm includes three basic steps. A pre-processing of the image to convert Bayer data to YCbCr format with 4:2:2 or 4:2:0 sub sampling. The size of color image is, of course, three times bigger than that the Bayer data and, to avoid increasing redundancy, the size of data should not be increased after color format conversion. Thus, conversion is done as follows: each Y data includes common blue and red pixels and a different green pixel, while Cb and Cr data includes blue, red and the average of two properly chosen green pixels. After this transformation, Y data presents blank pixels, therefore Jpeg compression cannot be directly applied. Therefore, the second step is another transformation that simply rotates the Y data 45°.

After rotation, Y data are concentrated at the center of the image of rhombus shape by removing rows and columns that contain blank pixels. Finally, Jpeg compression is performed. Blocks located along the boundaries of Y image data are filled by using a mirroring method. Other Bayer data compression techniques are described in U.S. Pat. No. 5,172,227 to Tsai et al. and entitled "Image Compression with Color Interpolation for a Single Sensor Image System" and Le Gall, A. Tabatabai, Subband Coding of Digital Images Using Symmetric Shor Kernel Filters and Arithmetic Coding Techniques, in Proceedings of the ICASSP 88 Conference, (New York), pp. 761-764, April 1988.

Vitali A., Della Torre L., Battiato S., Buemi A. in "Video and Image Lossy De/Compression By Perceptual Vector Quantization", EP-A-1406447 disclose a compression technique based on Vector Quantization wherein the quantization step varies taking into account certain subjective quality sensibility characteristics of the Human Visual System. Bayer pattern values are gathered according to the channel they belong to in groups of two pixels and the so generated couple is quantized with a function that accounts for the effects of "Edge Masking" and "Luma Masking".

Modestino et al. describe in "Adaptive Entropy-Coded Predictive Vector Quantization of Images" IEEE Transaction on Signal Processing, Vol 40 No 3, March 1992 discuss two dimensional predictive vector quantization of images subject to an entropy restraint.

Although the source data format of a Bayer pattern is amenable to compression with relatively simple means and with a relatively low computational burden, the known image compression algorithms so far proposed require a non-negligible computational complexity and a relatively large external memory requirement.

SUMMARY OF THE INVENTION

It is an object of the present invention to provide a simple yet more efficient manner of compressing video or still image Bayer pattern pixel data that would eliminate processing redundancies and imply a practically negligible computational complexity, such to allow an simple hardware implementation.

A particularly efficient and simple method for Bayer color filter array (CFA) compression has been found that while yielding a substantially lossless performance of the compression-decompression processes, requires practically negligible computational complexity and external memory requirement.

According to this invention, the method of compressing video or still image Bayer pattern pixel data to be successively processed to a full color image through color interpolation of each pixel of the full color image, comprises splitting the Bayer data in three distinct sequences or channels of pixel data, one for each basic color filtered pixels of the image, and of compressing separately each channel data according to a selected compression process. The method includes: for each color channel, gathering Bayer pattern pixel values by pairs, each pair being composed by two successive pixels belonging to the channel along the scanning direction of the pixels of the image, thus each pair of values representing a current input vector; calculating a predictor vector of the input vector in terms of the differences between the values defining the input vector and a pair of prediction values generated according to a certain criterion, for representing a prediction error; quantizing each so calculated predictor vector according to a heavier or lighter degree of quantization depending on whether the predictor vector is representative of an area of relatively uniform color of the image or of an area of relatively abrupt changes of colors of the image; and generating a multibit code representative of the quantized predictor vector of the input vector according to a certain compression ratio.

Recognition of the type of image area of which the current predictor vector is representative is attained in an efficient manner by dividing the input vectorial space in regions, all subdivided in an identical number of equal areas, and having increasingly larger dimensions as they become more and more remote from the origin, and by mapping each predictor vector to a target vector of a set of target vectors, according to the region of division of the whole input vectorial space (domain) on which the predictor vector falls.

In consideration of the Human Visual System (HVS) that establishes a far more enhanced sensitivity to color variations occurring in relatively uniform areas of the image that is in areas where there are not edges or boundaries of objects implying abrupt color changes, then in areas of the image where numerous close by boundaries are present, according to an important aspect of the method of this invention, predictor vectors quantization (VQ) is performed in a way to match the HVS characteristics. This enhances efficiency of the compression process while ensuring a practically lossless performance.

In the sample embodiment illustrated, the input vectorial space is divided in regions of different dimensions, while each region is divided in a same number (e.g. 64) of subregions of identical areas, by dividing its horizontal and vertical dimension, for example, by eight. Therefore, regions of larger dimensions will be associated to a proportionately stronger quantization while regions of smaller dimensions will be associated to a proportionately reduced quantization, such that a greater proportion of information is preserved in the compression process.

This, coupled to the fact that the differential pulse code modulation (DPCM) step is conducted on pairs of values of relatively neighboring pixels of one of the channels in which the pixels of the original image have been grouped, the prediction errors that are generated are rather small, and vector quantization may be performed with a substantially negligible computational complexity.

In terms of hardware implementability, the compression process may be implemented by the use of simple logic gates, requiring no complex divisions or shift operations. The method of this invention may also be easily implemented with a software computer program.

DETAILED DESCRIPTION OF THE PREFERRED EMBODIMENTS

Figure 1:
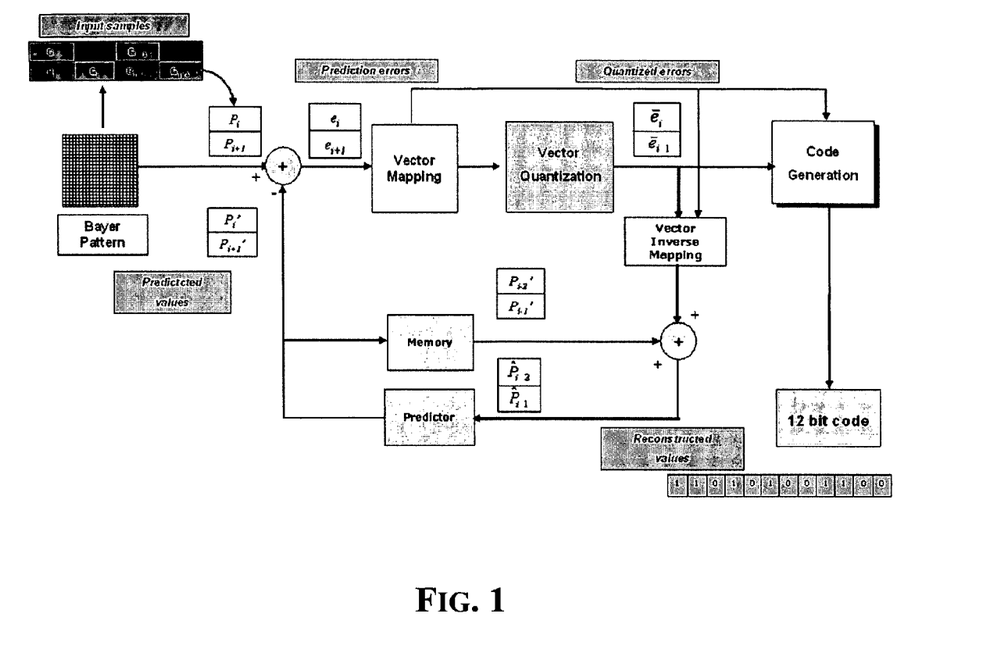
FIG. 1 is a schematic block diagram illustrating the DPCM+VQ compression process of this invention.

The source data is organized according to a Bayer color filter array (CFA) or briefly to a Bayer pattern, and the data sequences to be separately encoded are the pixel values belonging to each one of the three basic colors channels (R,G,B). FIG. 1 illustrates the method of DPCM+VQ compression process, according to this invention.

DPCM:

As depicted in the approach of FIG. 1, the input Bayer data are scanned line by line. The values $P_i$ and $P_{i+1}$ (that are two successive pixels the same color channel of the Bayer image) are gathered in pairs (or couples) and for each so defined current input vector $P_i$, $P_{i+1}$, prediction values, $P_i'$, $P_{i+1}'$ are generated to calculate the differences or prediction errors $e_i$, $e_{i+1}$ that define what is called the predictor vector of the current vector. The DPCM step that precedes the VQ step exploits the high spatial correlation among adjacent pixels, to perform compression by coding just the new information between adjacent pels. In particular, the "new information" is given by the prediction errors.

Generation of such a predictor vector may be established in any appropriate manner. In the simplest implementation, the predicted values for the successive pairs of values may be assumed to be the current pair of values, or two identical values equal to the second value of the current pair of values (in consideration of the fact that the second value of the current pair is that of a pixel spatially closer to the next pairs of values (pixels) belonging to the same color channel).

Figure 2:
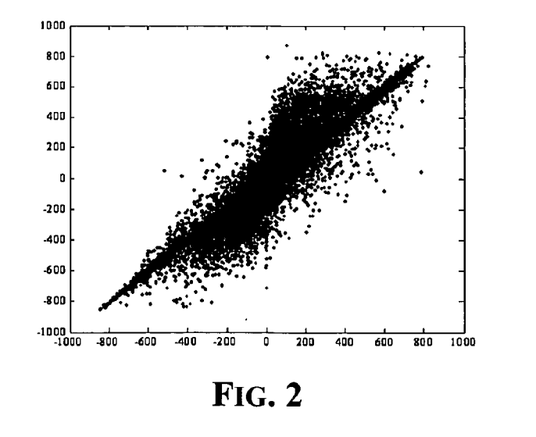
FIG. 2 is a chart showing a typical prediction error distribution.

A typical error distribution of such predictor vectors is shown in FIG. 2. According to an aspect of the method of this invention, in considering that a relatively large percentile of values fall near the origin, the Vector Quantization step that follows is aimed to efficiently match such a distribution.

The DPCM loop includes computing the difference between the vector representing the current pair of pixel to be coded and the prediction value. To avoid error propagation, the coding the prediction is obtained from the restored values $\hat{P}'_{i-2}, \hat{P}'_{i-1}$, outputted by the co/decoding procedure applied to the original values $P'_{i-2}, P'_{i-1}$. The prediction errors $e_i, e_{i+1}$ are given by the difference between the vectors $P_i$ and $P_{i+1}$ and $\hat{P}'_{i-2}, \hat{P}'_{i-1}$. Thus, the encoder uses the same data of the decoder and the prediction error doesn't affect the following prediction.

Moreover, since the error distribution is symmetric respect to the origin (FIG. 2), just the upper side is used to perform the coding. One bit, called "inversion flag" will be used in the final 12-bits code to know in which side of the space each prediction error falls. The "Vector Mapping" block performs this step, while the "Vector Quantization" phase allows obtaining the compression, as discussed in the following sections.

Vector Quantization:

Each predictor vector $e_i$, $e_{i+1}$ is mapped to a set of target vectors, also called codevectors in literature, according to the region of the input vectorial space in which the vector falls and is accordingly quantized in the block of "Vector Quantization" to produce a quantized error vector: $\bar{e}_i, \bar{e}_{i+1}$. Quantization will discard information according to psycho-visual considerations.

Each codevector is associated to a respective region of division of the input vectorial space that gather all the input predictor vectors that will be mapped in it. According to what has been already explained above, it is therefore possible to attribute to the input predictor vector a certain output codevector without calculating the distance of the input vector from all the codevectors. If all the regions have identical dimensions, the quantization is uniform. For the purpose of the particular application considered, it is productive to vary the dimensions of the various regions to implement a different degree of quantization in function of the location of a region in the input space as referred to the origin matching the peculiar sensibility to variations of the Human Visual System.

Figure 3:
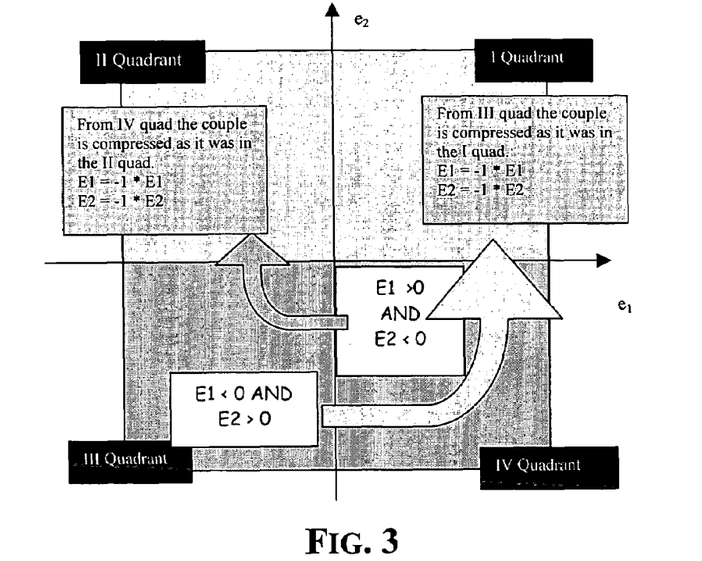
FIG. 3 is a schematic block diagram illustrating a preferred approach of mapping of predictor vectors on the vectorial plane.

By considering that the DPCM loop concentrates values in the neighborhood of the origin (zero), a very high percentile of values will fall in regions of division relatively close to the origin. For the test images considered, about 65% of predictor vector values are, in absolute terms, smaller than 20 and about 80% of predictor vector values are smaller than 38. As depicted in FIG. 3, the quantization board (that is the input vectorial space) is divided in main portions by considering the symmetry of the scattering of the values in the four quadrants, as may be inferred by observing FIG. 2.

Through the vector mapping carried out in the block "Vector Mapping" of FIG. 1, if values fall in the upper quadrants, no action is taken and the first bit of the code is set to zero and if the predictor error values to be compressed fall in the lower quadrants, the signs of the error values $e_1$ and $e_2$ are changed. In this way a predictor error pair of values falling in the third quadrant will be quantized as if they were in the first quadrant and similarly a predictor error pair of values falling in the fourth quadrant will be quantized as they were in the second quadrant. When such an inversion takes place, the first bit of the output code is set to 1, as will be described in more detail later in this description.

Figure 4:
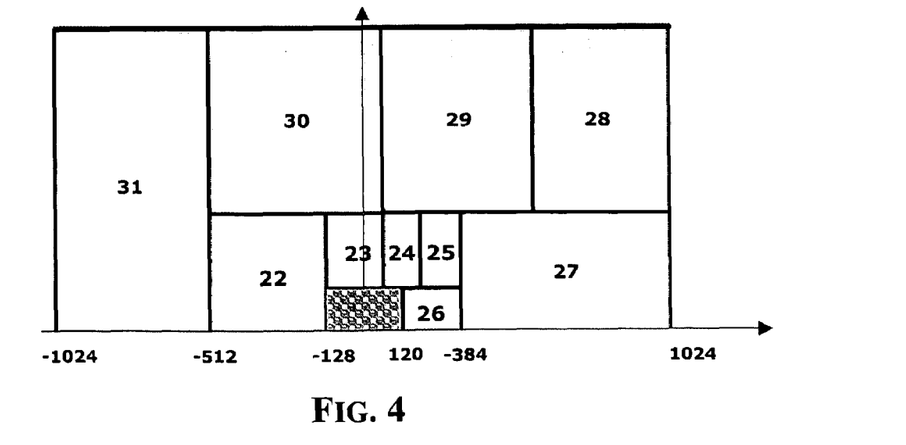
FIG. 4 is a table illustrating a sample division of the quantization table in distinct regions of different dimensions.
Figure 5:
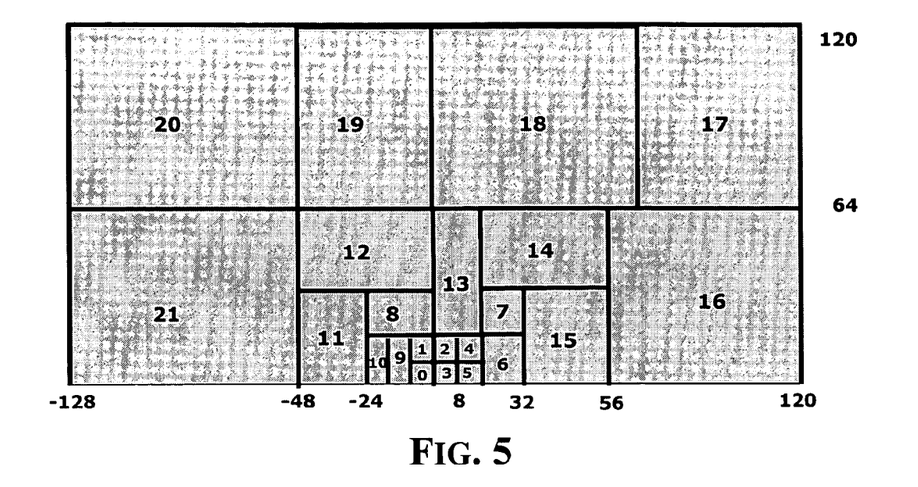
FIG. 5 is a table illustrating an enlarged detail representation of the division of the innermost zone of the quantization table.
Figure 6:
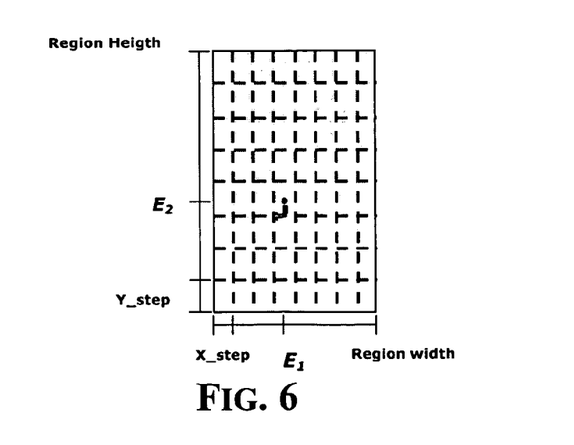
FIG. 6 is a schematic diagram illustrating a sample subdivision of each quantization region.

As shown in the FIGS. 4 and 5, the upper portion of the quantization board (equivalent to the input vectorial space) is divided in regions that are shaped and distributed to minimize the quantization error. Each region has different dimensions and position on the quantization board. According to the sample embodiment considered and illustrated, every region is divided in 64 sub-regions of identical areas by dividing the horizontal and vertical dimensions by eight, as depicted in FIG. 6. Therefore larger regions are subdivided in 64 larger areas for a heavier quantization, while smaller regions are subdivided in 64 smaller areas for a lighter quantization with a bigger part of information being preserved uncompressed.

With reference to the indications shown in FIG. 6, each pair of prediction error values E1, E2 is approximated by the nearest couple and coding of the horizontal or X-coordinate takes place as follows:

```
x_val = E1 − position_X_region[reg] + Half _X_step;
x_code = x_val / X_step;
if(x_code == 8)
{
    x_val = E1 − position_X_region[reg][0];
    x_code = x_val / X_step;
}
```

Position_X_region is the coordinate on the horizontal axis of the lower left point of the region. Position_Y_region is the coordinate on the vertical axis of the lower left point of the region. X_step is the quantization step in the horizontal direction given by:

$$X\_Step = \frac{RegionWidth}{8}$$

Y_step is the quantization step in the vertical direction given by:

$$Y\_Step = \frac{Region\_Heigth}{8}$$

Half_X_step, Half_Y_step are the half of the quantization step and are used to provide the rounding feature in quantization.

If the point is near the upper limit of the region, the rounding feature will associate the point with the next region (X_code=8). In this case, the half value is not added and a normal quantization is done. Evaluation of the quantized value is as follows: QE_1=position_X_region[reg]+X_step*x_code; QE_2=position_Y_region[reg]+Y_step*y_code.

Code Generation

Figure 7:
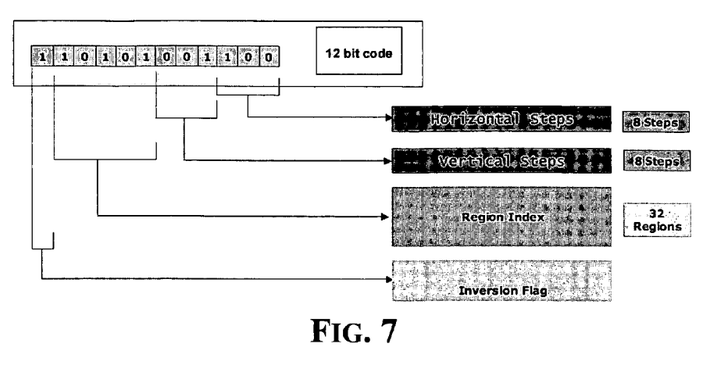
FIG. 7 is a schematic diagram illustrating the mechanism of multibit code composition.

The process of composition of the code is depicted in FIG. 7. The information is encoded as follows: The point to be quantized is in the upper quadrants or not (1 bit); The region where the point falls (5 bits); X-coordinate Code (3 bits); Y-coordinate Code (3 bits).

BP Decoding

Figure 8:
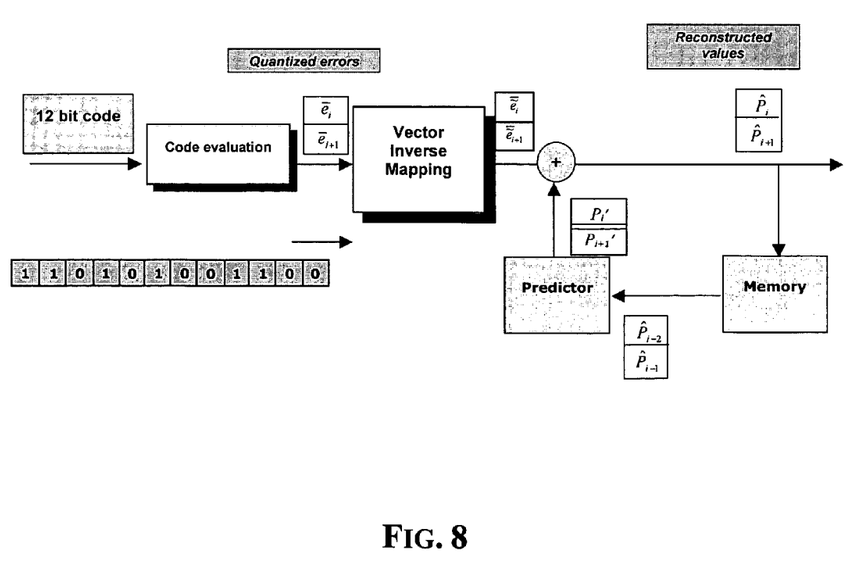
FIG. 8 is a schematic block diagram illustrating the decompression process.

The decoder scheme is depicted in FIG. 8. The decoding process includes a code evaluation operation performed in the block Code Evaluation of FIG. 8 for the extraction of the compressed values that is the quantized errors $\bar{e}_i$, $\bar{e}_{i+1}$ contained in the multibit code. The operation performed in the block "Inverse Vector Mapping" assigns the correct sign to the quantized error values as a function of the value of the one bit flag quadrant information contained in the multibit code.

Finally reconstruction of the input vector is done by adding the decoded quantized prediction errors of a certain sign to the predicted pair of input values as previously done during the compressing process and stored in the RAM block Memory.

Process Analysis

By considering the case in which prediction is made by using the last of the previously elaborated pair of input values, the prediction has null computational cost and the DPCM is done with:

| Shift | Add | Div | Mult | Comp | AND |
|---|---|---|---|---|---|
| 0 | 2 | 0 | 0 | 0 | 0 |

The cost of Vector Mapping and of Inverse Vector Mapping is:

| Shift | Add | Div | Mult | Comp | AND |
|---|---|---|---|---|---|
| 0 | 0 | 0 | 0 | 16 | 0 |

The cost of region selection on the quantization board is:

| Shift | Add | Div | Mult | Comp | AND |
|---|---|---|---|---|---|
| 0 | 0 | 0 | 0 | 16 | 0 |

Statistically 65% of the values are, in absolute terms, smaller than 20 and in this case only 6 comparisons are needed. 80% of values are, in absolute terms, smaller than 38 and the region is selected with 8 comparisons.

Cost of Quantization:

| Shift | Add | Div | Mult | Comp | AND |
|---|---|---|---|---|---|
| 5 | 6 | 4 | 2 | 4 | 4 |

In the worst case, the computational cost of compression, for each pair of pixels, is:

| Shift | Add | Div | Mult | Comp | AND |
|---|---|---|---|---|---|
| 5 | 8 | 4 | 2 | 22 | 8 |

Therefore, the cost per pixel is:

| Shift | Add | Div | Mult | Comp | AND |
|---|---|---|---|---|---|
| 3 | 4 | 2 | 1 | 11 | 4 |

The cost for decompression is the cost for the reconstruction of the quantized values from the "horizontal" and "vertical coordinates" plus the cost for the "Inverse Vector Mapping" and the cost for the reconstruction of values in the DPCM loop.

Totally for each pairs of pixels the cost is:

| Shift | Add | Div | Mult | Comp | AND |
|---|---|---|---|---|---|
| 0 | 4 | 0 | 2 | 1 | 2 |

The computational cost for pixel is:

| Shift | Add | Div | Mult | Comp | AND |
|-------|-----|-----|------|------|-----|
| 0 | 2 | 0 | 1 | 1 | 1 |

The memory requirement for the storage of constant values is:

| | |
|---|---|
| 17 <= vqsnr < 21 | Marginal |
| 21 <= vqsnr < 25 | Passable |
| 25 <= vqsnr < 29 | Normal |
| 29 <= vqsnr < 33 | Good |
| 33 <= vqsnr < 37 | Fine |
| 37 <= vqsnr | Excellent |

The performance of the novel method of this invention (DPCM+VQ), under the above test conditions and standard sets of test images, was compared with the performance of a common vector quantization compression method (VQ) and with a commercially used compression method of Nokia.

For each region:

| | |
|---|---|
| Region Position (Hor. and Vert. coordinates) | 22 bits |
| Region Dimension | 22 bits |
| Region Quantization Step | 22 bits |
| Totally, for all the 32 regions of the example considered: | 2112 bits |
| Thresholds for the regions (24 × 11 bits) | 264 bits |
| Values to bind thresholds to regions | 119 bits |
| Grand Total | 2971 bits |
| | (2.9 Kbits). |

Notwithstanding the reduced computational cost per pixel of the novel method and implementing hardware architecture of this invention, in terms of PSNR, the method of this invention compared favorably and generally yielded a better performance than known methods.

The algorithm has been tested on a set of about 100 images, acquired by a CMOS-VGA sensor at different light conditions. Experimental results showed that the compression does not involve a perceptible loss of quality in the output. As a result, the bit rate is low (a compression of 40% of the input data is achieved) and the distortion is also kept low (about 50 dB PSNR). Such results, joined with the low resource requirements, make the process more efficient than the most common approaches described in literature. This method may preferably be implemented with a software computer program performing the method steps previously described when run on a computer.

That which is claimed is:

1. A method of compressing image Bayer pattern pixel data acquired by a digital image sensor to be successively processed to a full color image, within an image processor, through color interpolation of each pixel of the full color image, the method comprising:
    within an image divider of the image processor, dividing the Bayer data in three channels of pixel data including a channel for each basic color filtered pixels of the image;
    within a data compressor of the image processor, separately compressing each channel data according to a compression process comprising
    for each color channel, gathering Bayer pattern pixel values for processing by pairs, each pair including two successive pixels belonging to a same channel along a image pixel scanning direction, each pair of values representing a currently processed input vector,
    calculating a predictor vector of the input vector based upon differences between the values defining the input vector and a pair of prediction values representing a prediction error,
    quantizing each calculated predictor vector according to one of a heavier and lighter degree of quantization depending on whether the predictor vector is representative of an area of relatively uniform color of the image or an area of relatively abrupt changes of colors of the image, and
    generating a multibit code representative of the quantized predictor vector of the input vector based upon a compression ratio.

2. The method of claim 1, wherein quantizing comprises determining a type of image area of which the predictor vector is representative by dividing a vectorial space of the input vector into regions subdivided in an identical number of equal areas, having increasingly larger dimensions as they are located farther from the origin, and by mapping each prediction vector to a target vector of a set of target vectors, according to the region on which the predictor vector falls.

3. The method of claim 1, wherein the image pixel scanning direction comprises a linewise raster mode image pixel scanning direction.

4. The method of claim 1, wherein the pair of prediction values for processing a next pair of gathered pixel values correspond to the values of the current pair of gathered pixel values.

5. The method of claim 1, wherein the pair of prediction values for processing a next pair of gathered pixel values correspond to a second value of the current pair of gathered pixel values.

6. The method of claim 1, wherein only upper quadrants of the input vectorial space are divided in the regions on which to map each predictor vector by recording a sign inversion of the respective prediction errors values for the input prediction vectors falling in third and fourth quadrants, in a one bit flag of the multibit code.

7. The method of claim 1, wherein information of each pair of Bayer pattern pixel data is encoded in the multibit code including:
    one bit flag indicating whether the prediction error vector maps in a upper or lower quadrant of the input vectorial space;
    five bits identifying the region of division of the upper quadrants of the input vectorial space on which the prediction vector falls;
    three bits representing an X-coordinate of the prediction vector; and
    three bits representing a Y-coordinate of the prediction vector.

8. An image processor for compressing image Bayer pattern pixel data acquired by a digital image sensor to be successively processed to a full color image through color interpolation of each pixel of the full color image, the processor comprising:
    an image divider to divide the Bayer data in three channels of pixel data including a channel for each basic color filtered pixels of the image; and
    an image compressor to separately compress each channel data according to a compression process comprising for each color channel, gathering Bayer pattern pixel values for processing by pairs, each pair including two successive pixels belonging to a same channel along a image pixel scanning direction, each pair of values representing a currently processed input vector, calculating a predictor vector of the input vector based upon differences between the values defining the input vector and a pair of prediction values representing a prediction error, quantizing each calculated predictor vector according to one of a heavier and lighter degree of quantization depending on whether the predictor vector is representative of an area of relatively uniform color of the image or an area of relatively abrupt changes of colors of the image, and generating a multibit code representative of the quantized predictor vector of the input vector based upon a compression ratio.

9. The processor of claim 8, wherein quantizing comprises determining a type of image area of which the predictor vector is representative by dividing a vectorial space of the input vector into regions subdivided in an identical number of equal areas, having increasingly larger dimensions as they are located farther from the origin, and by mapping each prediction vector to a target vector of a set of target vectors, according to the region on which the predictor vector falls.

10. The processor of claim 8, wherein the image pixel scanning direction comprises a linewise raster mode image pixel scanning direction.

11. The processor of claim 8, wherein the pair of prediction values for processing a next pair of gathered pixel values correspond to the values of the current pair of gathered pixel values.

12. The processor of claim 8, wherein the pair of prediction values for processing a next pair of gathered pixel values correspond to a second value of the current pair of gathered pixel values.

13. The processor of claim 8, wherein only upper quadrants of the input vectorial space are divided in the regions on which to map each predictor vector by recording a sign inversion of the respective prediction errors values for the input prediction vectors falling in third and fourth quadrants, in a one bit flag of the multibit code.

14. The processor of claim 8, wherein information of each pair of Bayer pattern pixel data is encoded in the multibit code including:
- one bit flag indicating whether the prediction error vector maps in a upper or lower quadrant of the input vectorial space;
- five bits identifying the region of division of the upper quadrants of the input vectorial space on which the prediction vector falls;
- three bits representing an X-coordinate of the prediction vector; and
- three bits representing a Y-coordinate of the prediction vector.

* * * * *

UNITED STATES PATENT AND TRADEMARK OFFICE
CERTIFICATE OF CORRECTION

PATENT NO. : 7,676,082 B2  Page 1 of 1
APPLICATION NO. : 11/146469
DATED : March 9, 2010
INVENTOR(S) : Vella et al.

It is certified that error appears in the above-identified patent and that said Letters Patent is hereby corrected as shown below:

| | |
|---|---|
| Column 2, Line 41 | Delete: "make"<br>Insert: --they make it-- |
| Column 2, Line 66 | Delete: "in" |
| Column 3, Line 6 | Delete: "that" |
| Column 3, Line 17 | Delete: "of rhombus"<br>Insert: --of the rhombus-- |
| Column 3, Line 38 | Delete: "describe" |
| Column 3, Line 56 | Delete: "such to"<br>Insert: --such as to-- |
| Column 3, Line 56 | Delete: "an"<br>Insert: --a-- |
| Column 5, Line 25 | Delete: "colors"<br>Insert: --color-- |
| Column 5, Line 57 | Delete: "pixel"<br>Insert: --pixels-- |
| Column 5, Line 66 | Delete: "symmetric respect"<br>Insert: --symmetric with respect-- |

Signed and Sealed this

Twenty-eighth Day of September, 2010

David J. Kappos
*Director of the United States Patent and Trademark Office*